Nov. 10, 1953 V. J. COATES 2,658,395
DIFFERENTIAL KNOB DEVICE
Filed Nov. 15, 1951

INVENTOR
Vincent J. Coates
BY
Pennie Edmonds Morton Barrows & Taylor
ATTORNEYS

Patented Nov. 10, 1953

2,658,395

UNITED STATES PATENT OFFICE 2,658,395

DIFFERENTIAL KNOB DEVICE

Vincent J. Coates, South Norwalk, Conn., assignor to The Perkin-Elmer Corporation, Norwalk, Conn., a corporation of New York Application November 15, 1951, Serial No. 256,509

7 Claims. (Cl. 74—10.52)

This invention relates to differential knob devices used for rotating an element, such as a shaft, and indicating the full turns and fractional parts of a turn, through which the element is moved. More particularly, the invention relates to a novel differential knob device, which is made of a relatively few simple parts and can be readily assembled and taken apart. The new device may be advantageously employed in connection with an instrument having an adjusting shaft, which is rotated in the use of the instrument and the position of which must be exactly set and known, and a form of the device of the invention for use in such an instrument is shown in the accompanying drawing.

Figure 1:
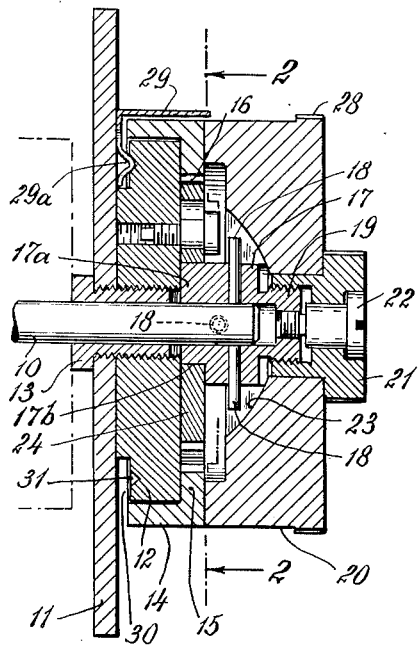
Fig. 1 is a view, partly in elevation and partly in section on the line 1—1 of Fig. 3, of the new device.
Figure 2:
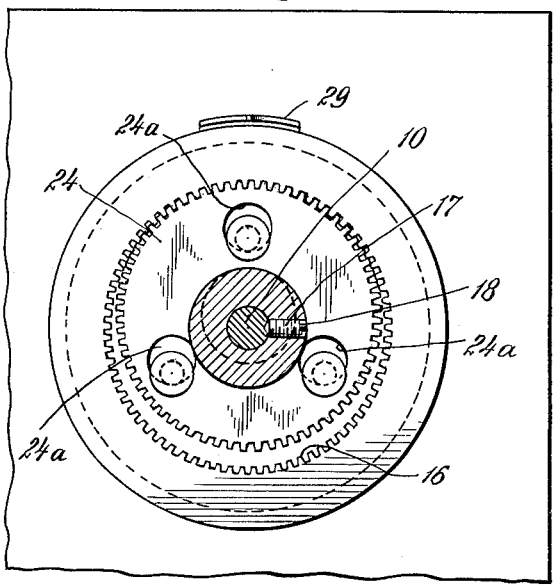
Fig. 2 is a sectional view on the line 2—2 of Fig. 1.
Figure 3:
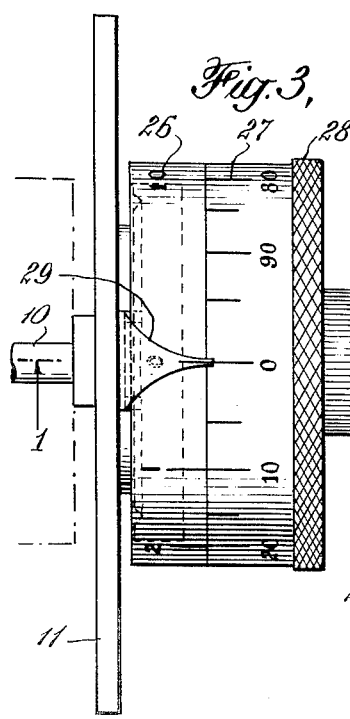
Fig. 3 is a top plan view of the device.
Figure 4:
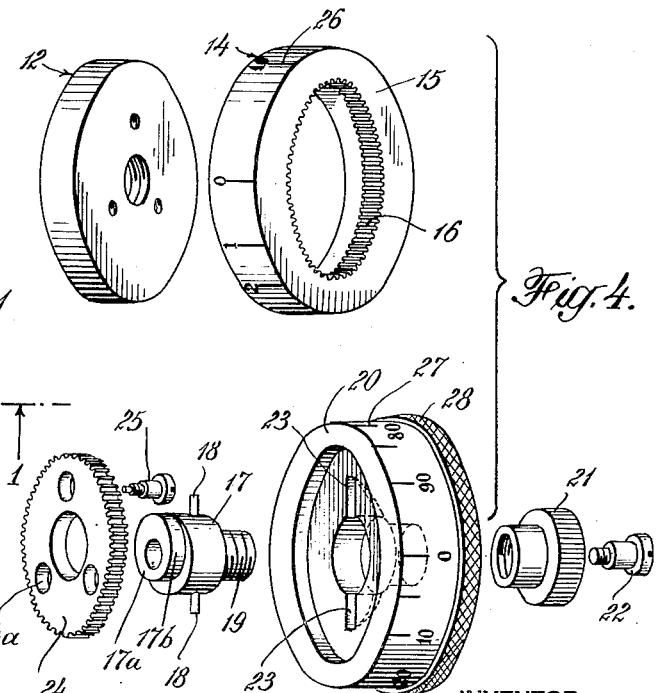
Fig. 4 is an exploded perspective view of the parts of the device.

The differential knob device illustrated in the drawing is for use in operating the shaft 10 of an instrument having a casing provided with a front panel 11. The shaft 10 extends through an opening in the panel and the device is mounted on the exposed end of the shaft. The device includes a base 12, which is of circular outline and has a central opening for the shaft. The base is attached to the outer face of panel 11 in any convenient manner and, in the construction illustrated, the openings through the panel and through the base are internally threaded and an externally threaded headed bushing 13 is turned through the panel opening and into the opening in the base, the tightening of the bushing causing the panel to be clamped between the base and the head of the bushing.

A coarse dial member 14 has a cylindrical section encircling the base and an internal flange 15 overlying the end of the base remote from the panel and provided with internal gear teeth 16. In the construction shown, the flange and the cylindrical section of member 14 are integral, but, if desired, the dial member may be made of a cylindrical section and an internal gear taking the place of the flange and tightly fitting within the cylindrical section.

The shaft projects through the coarse dial member and a bearing bushing 17 is mounted on the exposed end of the shaft and held in place by a set screw 18. The bushing has a section 17a having a peripheral bearing surface 17b, which is eccentric to the central bore through the bushing. The bushing is also provided with a pair of radial pins 18 and with an externally threaded end section 19 projecting beyond the end of the shaft.

A fine dial member 20 is mounted to abut the outer face of the coarse dial member 15 and the member 20 has a central opening, into which the threaded end 19 of the bearing bushing extends. The member 20 is engaged by a headed clamp screw 21 extending through an opening in the member and threaded on the end section 19 of the bearing bushing. The clamp screw holds the member 20 tightly against member 14 and holds member 14 against the base 12. The end section 19 of the bearing bushing is internally threaded and a stop screw 22, passing through a central bore in clamp screw 21 and threaded into end section 19, locks the clamp screw in place. The member 20 is provided with internal radial slots 23 receiving the pins 18 on the bearing bushing and, when member 20 is rotated manually, it causes the member 14, the bearing bushing, and the shaft to rotate with it.

An external ring gear 24 has an axial opening receiving the eccentric section 17a of the bearing bushing and gear 24 has less teeth than there are internal teeth on the flange 15 of the coarse dial member 14. The eccentricity of section 17a of the bearing bushing is such that certain of the teeth of gear 24 are always in mesh with teeth 16. The gear 24 is provided with one or more eccentric openings 24a and headed studs 25, one for each opening, are passed through the openings and threaded into bores in base 12. The portions of the studs lying within the openings in the gear are of substantially less diameter than the openings, and the heads on the studs lie outside the openings. The studs thus permit the gear to be given an eccentric motion, as the shaft is rotated, and hold the gear against axial movement.

The coarse dial member 14 and the fine dial member 20 are provided with peripheral scales 26, 27, respectively, and the fine dial member 20 may be provided with a knurled peripheral section 28, so that the member can be readily grasped and turned. A pointer 29 overlies the scales and may be mounted in place in an convenient manner. In the construction illustrated, the base is formed with a channel 30 between its inner face and panel 11 and the pointer has an end turned at an angle and extending into the channel. This end of the pointer is provided with an offset portion 29a, which snaps into an annular recess 31 in the radial surface of the base defining channel 30.

Since the gear 24 has less teeth than there are teeth 16 on the flange of the coarse dial member 14, the member 14 is rotated through a relatively small angle for each complete rotation of the bearing bushing 17 with the shaft. For example, if there are 72 teeth on the flange and 66 teeth on the gear, the number of revolutions of the shaft required to produce a single revolution of member 14 is equal to the quotient of 72 divided by the difference between the number of teeth on the flange and on the gear, that is, is equal to 12. Each complete rotation of the fine dial member 20 thus results in $\frac{1}{12}$ revolution of the coarse dial member 14. The scale 26 is, accordingly, selected in view of the number of gear teeth on the coarse dial member flange and on gear 24.

In the new device, the rotation of the shaft by the fine dial member causes gear 24 to move with a wobble motion, and the gear is always held in place by its contacts with the eccentric bearing surface 17b on bearing bushing 17 and with the three studs 25. As the fine dial member is rotated, gear 24 moves smoothly and continuously with little or no backlash and the coarse dial member 14 is turned without retrogression at any point in its rotation.

I claim:

1. A differential knob device for rotating a shaft, which comprises a base having an external bearing surface and a central opening for the passage of the shaft, a coarse dial member encircling and mounted for rotation on the base and having an internal flange engaging one end of the base, the inner edge of the flange being provided with internal gear teeth, a fine dial member engaging the outer surface of the coarse dial member and having a central passage through it, a bushing within said passage having a central bore for the shaft and an external bearing surface eccentric with the bore, an external ring gear of less teeth than the number of teeth on said flange having an axial opening receiving the eccentric bearing surface with part of the teeth of the gear engaging teeth on the flange, the ring gear having an eccentric opening parallel to its axis, a projection on the base entering the eccentric opening in the gear, the projection being smaller than said opening, and means attached to the bushing and clamping said dial members together and the coarse dial member against the base.

2. A differential knob device for rotating a shaft, which comprises a base having an external bearing surface and a central opening for the passage of the shaft, a coarse dial member encircling and mounted for rotation on the base and having an internal flange engaging one end of the base, the inner edge of the flange being provided with internal gear teeth, a fine dial member engaging the outer surface of the coarse dial member and having a central passage through it, a bushing within said passage having a central bore for the shaft and an external bearing surface eccentric with the bore, an external ring gear of less teeth than the number of teeth on said flange having an axial opening receiving the eccentric bearing surface with part of the teeth of the gear engaging teeth on the flange, the ring gear having an eccentric parallel to its axis, a projection on the base entering the eccentric opening in the gear, the projection being smaller than said opening, means on the bushing engaging the fine dial member and connecting the bushing and member for rotation in unison, and means attached to the bushing and clamping the dial members together and the coarse dial member against the base.

3. A differential knob device for rotating a shaft, which comprises a base having an external bearing surface and a central opening for the passage of the shaft, a coarse dial member encircling and mounted for rotation on the base and having an internal flange engaging one end of the base, the inner edge of the flange being provided with internal gear teeth, a fine dial member engaging the outer surface of the coarse dial member and having a central passage through it, a bushing within said passage having a central bore for the shaft and an external bearing surface eccentric with the bore, an external ring gear of less teeth than the number of teeth on said flange having an axial opening receiving the eccentric bearing surface with part of the teeth of the gear engaging teeth on the flange, the ring gear having an eccentric opening parallel to its axis, a projection on the base entering the eccentric opening in the gear, the projection being smaller than said opening, and a clamping element mounted on the bushing and clamping the dial members together and the coarse dial member against the base.

4. A differential knob device for rotating a shaft, which comprises a base having an external bearing surface and a central opening for the passage of the shaft, a coarse dial member encircling and mounted for rotation on the base and having an internal flange engaging one end of the base, the inner edge of the flange being provided with internal gear teeth, a fine dial member engaging the outer surface of the coarse dial member and having a central passage through it, a bushing within said passage having a central bore for the shaft and an external bearing surface eccentric with the bore, an external ring gear of less teeth than the number of teeth on said flange having an axial opening receiving the eccentric bearing surface with part of the teeth of the gear engaging teeth on the flange, the ring gear having an eccentric opening parallel to its axis, a projection on the base entering the eccentric opening in the gear, the projection being smaller than said opening, a clamping element mounted on the bushing and clamping the dial members together and the coarse dial member against the base, and means engaging the bushing and the element for retaining the element in fixed relation to the bushing.

5. A differential knob device for rotating a shaft, which comprises a base having an exterernal bearing surface and a central opening for the passage of the shaft, a coarse dial member encircling and mounted for rotation on the base and having an internal flange engaging one end of the base, the inner edge of the flange being provided with internal gear teeth, a fine dial member engaging the outer surface of the coarse dial member and having a central passage through it, a bushing within said passage having a central bore for the shaft and an external bearing surface eccentric with the bore, an external ring gear of less teeth than the number of teeth on said flange having an axial opening receiving the eccentric bearing surface with part of the teeth of the gear engaging teeth on the flange, the ring gear having an eccentric opening parallel to its axis, a projection on the base entering the eccentric opening in the gear, the projection being smaller than said opening, means attached to the bushing and clamping said dial members together and the coarse dial member against the base, the dial members having peripheral scales, and a pointer attached to the base and overlying the scales.

6. A differential knob device for rotating a shaft, which comprises a base having an external bearing surface and a central opening for the passage of the shaft, a coarse dial member encircling and mounted for rotation on the base and having an internal flange engaging one end of the base, the inner edge of the flange being provided with internal gear teeth, a fine dial member engaging the outer surface of the coarse dial member and having a central passage through it, a bushing within said passage in contact with the base, the bushing having a central bore for the shaft and an external bearing surface eccentric with the bore, means on the bushing for connecting the bushing and fine dial member for rotation in unison, an external ring gear of less teeth than the number of teeth on said flange having an axial opening receiving the eccentric bearing surface on the bushing with part of the teeth of the gear engaging teeth on the flange, the ring gear having an eccentric opening parallel to its axis, a stud on the base entering the eccentric opening in the gear, the stud being substantially smaller than the opening, and means mounted on the bushing and clamping the dial members together and the coarse dial member against the base.

7. A differential knob device for rotating a shaft, which comprises a base having an external bearing surface and a central opening for the passage of the shaft, a coarse dial member mounted for rotation on the external bearing surface on the base and having an internal flange at the outer end of the base, the flange having internal gear teeth, a fine dial member engaging the outer end of the coarse dial member and having a central passage through it, a bushing within the passage having a central bore for the shaft and an external bearing surface outside of and eccentric with the bore, an external ring gear of less teeth than the number of teeth on the flange having an axial opening receiving the eccentric bearing surface on the bushing with part of the teeth on the gear engaging teeth on the flange, the ring gear having a plurality of equiangularly spaced eccentric openings parallel to the axis of the gear, a projection on the base entering each eccentric opening in the gear, the projection being of less diameter than its opening, means for connecting the bushing, the shaft, and the fine dial member for rotation in unison, and means on the bushing for holding the dial members together and the coarse dial member in fixed relation to the base.

VINCENT J. COATES.

References Cited in the file of this patent

UNITED STATES PATENTS

| Number | Name | Date |
| --- | --- | --- |
| 2,167,677 | Petersen | Aug. 1, 1939 |